(12) United States Patent  (10) Patent No.: US 8,549,595 B1
Vaisman et al.  (45) Date of Patent: Oct. 1, 2013

(54) COUNTING DISTINCT OCCURRENCES OF A FACT USING MOVING STATISTICS WINDOW

(75) Inventors: Yana Vaisman, Netanya (IL); Tomer Meidan (Madi), Ramat Gan (IL)

(73) Assignee: EMC Corporation, Hopkinton, MA (US)

( * ) Notice: Subject to any disclaimer, the term of this patent is extended or adjusted under 35 U.S.C. 154(b) by 243 days.

(21) Appl. No.: 13/017,158

(22) Filed: Jan. 31, 2011

(51) Int. Cl.
*G06F 7/04* (2006.01)

(52) U.S. Cl.
USPC ....... 726/6; 726/7; 726/17; 713/152; 713/168

(58) Field of Classification Search
USPC .............. 726/6, 7, 17, 21; 713/152, 168, 713/182
See application file for complete search history.

(56) References Cited

U.S. PATENT DOCUMENTS

| | | | |
|---|---|---|---|
| 5,465,387 A | | 11/1995 | Mukherjee |
| 5,825,876 A | * | 10/1998 | Peterson, Jr. .................. 705/52 |
| 2004/0083394 A1 | * | 4/2004 | Brebner et al. ............... 713/202 |
| 2005/0097320 A1 | * | 5/2005 | Golan et al. ................. 713/166 |

* cited by examiner

*Primary Examiner* — Shewaye Gelagay
(74) *Attorney, Agent, or Firm* — BainwoodHuang

(57) ABSTRACT

An improved adaptive authentication technique involves defining a window array which stores the number of distinct fact values per time unit over a predetermined number of time units. Each element of the window array has a value set to the number of distinct fact values over a time unit. The window array is stored in a database. Under the improved technique, upon a user initiating an authorization request, the risk engine extracts the request and the window array from the database into a cache on the authorization server. The risk engine uses the request which contains a value of the fact to adjust values of the elements of the window array and, once the adjusting is completed, computing the fact velocity which is used in the determination of a risk score for the request.

20 Claims, 7 Drawing Sheets

COUNTING DISTINCT OCCURRENCES OF A FACT USING MOVING STATISTICS WINDOW

BACKGROUND

Adaptive authentication enables service providers to determine the authenticity of a user from a risk score based on multiple factors [e.g., IP addresses, device IDs]. For instance, attempts to log into a website from many different locations over a fixed period of time may be an indication of fraudulent usage.

In determining whether a user is as claimed, adaptive authentication provides a risk score to a current login request based on the values of the IP addresses historically associated with the user. For example, if a user submitted login requests from a single IP address over the past 30 days, and then sent a login request from a different IP address, then the adaptive authentication could, for example, require more information from the user to verify the user's identity.

Some of the factors used in adaptive authentication include historical request data associated with a user. Historical data associated with a user is maintained on a database which is accessible to the adaptive authentication. Each entry in the database corresponds to a request sent by the user and contains values of factors such as IP address, device ID, geo location, etc.

SUMMARY

Adaptive authentication performs an adaptive authentication operation by considering the values of, say, an IP address from a user within a predetermined time period, for example, 30 days. Such values are stored in entries on the database, with each entry associated with a request from the user. In performing the operation, a conventional adaptive authentication operation extracts the database entries from the user and computes an IP velocity, or the number of distinct IP address values over the predetermined time period. The IP velocity is one component of a risk score which is associated with an authentication request and used to determine if the request is coming from the user as claimed.

Unfortunately, the extraction of the database entries can represent a bottleneck on the computation of the IP velocity. A reason for this bottleneck is that the process of moving the large amount of information contained in the database entries combined with locating the information needed from the database entries for the IP velocity computation imposes a large burden on the memory storing the information and the processor running the adaptive authentication.

In contrast to the conventional authentication operation in which the computation of the velocity of a fact such as IP address is burdened by the loading of database entries for the computation into a memory, an improved authentication technique involves precomputing the number of distinct fact values over a specified time period and adjusting the number with each new authentication request. The improved technique involves defining a window array containing a number of elements [e.g., 30] and stores the number of distinct fact values per time unit [e.g., a day] in each element. The window array is stored in a database server which stores the database. Under the improved technique, upon a user initiating an authorization request, an authentication server extracts the request and the window array from the database server into a memory on the authentication server. A processor on the authentication server uses the request which contains a value of a fact of interest [e.g., IP address value] to adjust values of the elements of the window array [e.g., the number of distinct IP addresses corresponding to the day the request was initiated]. Once the adjusting is completed, the processor computes the fact velocity which is used in the determination of the authenticity of the user.

One embodiment of the improved technique is directed to a method of authenticating a user on a client computer, the user sending, from the client computer to a remote server, a request to perform an authentication operation, the request including a fact and a timestamp. The method includes extracting, from a database on a database server, a window array including elements, each element being associated with a time period. The method also includes adjusting values of elements of the window array based on a value of the fact and the timestamp of the request. The method further includes generating a fact velocity from the values of each element of the window array and performing the authentication operation based on the fact velocity.

Additionally, some embodiments of the improved technique are directed to a system configured to authenticate a user on a client computer. The system includes a network interface coupled to a network, a memory and a processor coupled to the memory, the processor configured to carry out the method of authenticating a user on a client computer.

Furthermore, some embodiments of the improved technique are directed to a computer program product having a non-transitory computer readable storage medium which stores code including a set of instructions to carry out the method of authenticating a user on a client computer.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved adaptive authentication technique involves defining a window array which stores the number of distinct fact values per time unit over a predetermined number of time units. Each element of the window array has a value set to the number of distinct fact values over a time unit. The window array is stored in the database. Under the improved technique, upon a user initiating an authorization request, the risk engine extracts the request and the window array from the database into a cache on the authorization server. The risk engine uses the request which contains a value of the fact to adjust values of the elements of the window array and, once the adjusting is completed, computing the fact velocity which is used in the determination of a risk score for the request.

Figure 1:
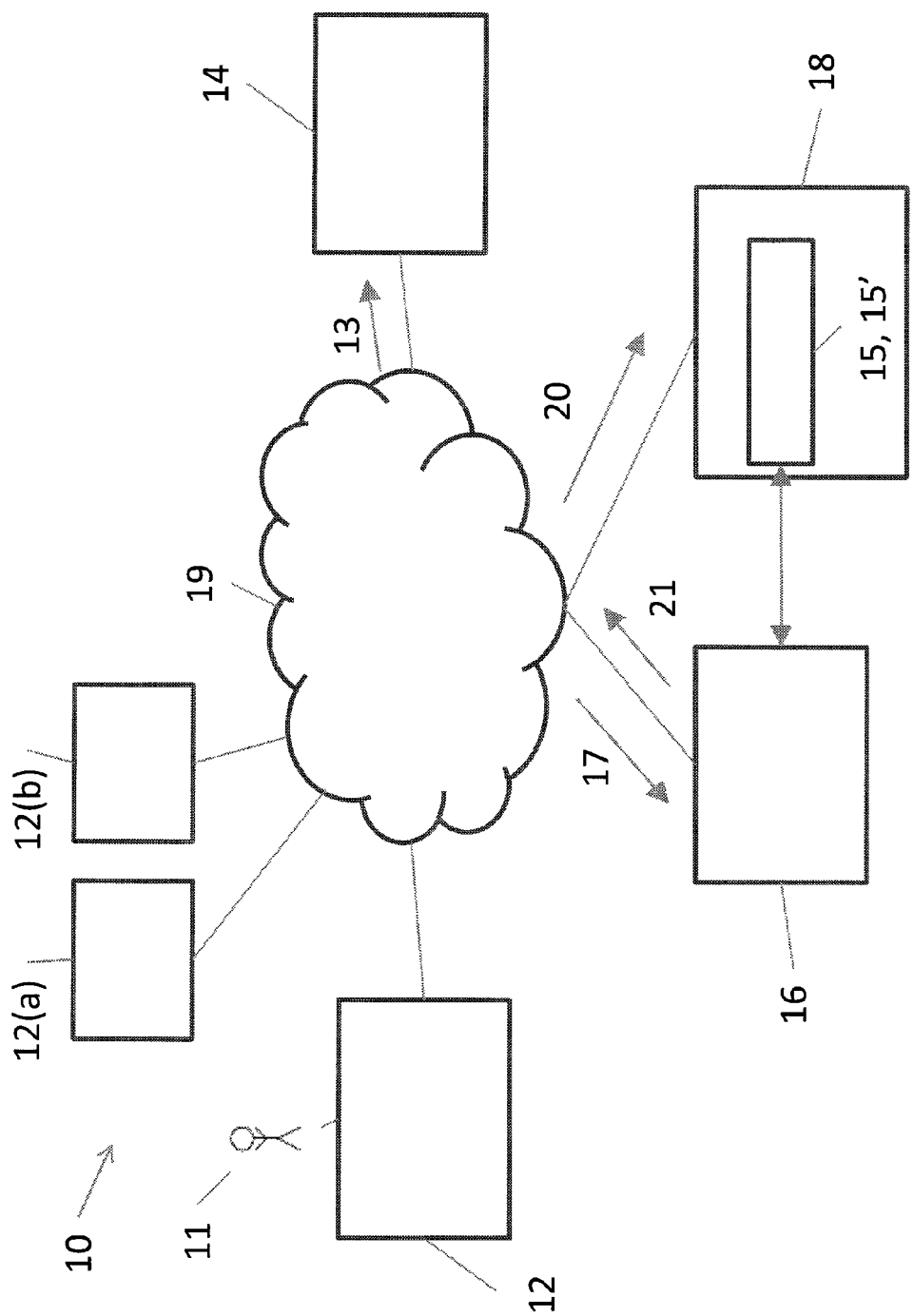
FIG. 1 is a schematic diagram of an electronic environment configured to carry out the improved technique.

FIG. 1 shows an electronic environment 10 which is suitable for use by the improved technique. Electronic environment 10 includes communication medium 19, client computers 12, 12(a) and 12(b), remote server 14, authentication server 16 and database server 18.

Communication medium 19 provides connections between client computer 12, remote server 14, authentication server 16 and database server 18. Communication medium 19 includes a public network, for example, the Internet.

Client computers 12, 12(a) and 12(b) are configured to run software, e.g., a web browser, which is configured to initiate an authentication request from user 11. Examples of client computers include desktop computers, laptop computers, personal digital assistants, cell phones and tablet computers. Current authentication request 13 is initiated on client computer 12 while previous authentication requests were initiated on client computers 12(a) and 12(b).

Remote server 14 is constructed and arranged to provide a website through which user 11 on client computer 12 can access services from an electronic service provider. An example of an electronic service provider is a financial institution such as a bank which hosts a web site on the remote server. Remote server 14 is also configured to receive authentication request 13 from client computer 12 over communications medium 19. To expand on the example of a bank, an authentication request from a user would take the form of a login request, the granting of which would provide the user access to information about an account in the bank.

Suppose that a user on a client computer wishes to log in to a bank's website in order to access information about his account. The bank takes in the login information which includes, for example, the IP address from which the login request was initiated. The bank now makes a decision as to whether or not to grant the login request to the user. The difficulty with this decision lies with the fact that, in an electronic environment, the bank cannot see the user and must use other information to determine if the user who initiated the login request is the user who owns the account. In an adaptive authorization application, the other information includes a behavioral profile of the user which contains a history of previous login requests. This history is stored with a third-party and the bank would need to initiate a request to analyze the history and send the request to an authentication server which will perform the analysis.

Authentication server 16 is constructed and arranged to perform authentication operations which determine a risk score for authentication request 13. Authentication server 16 receives analysis request 17, upon which receipt authentication server 16 prepares to perform an authentication operation, as will be detailed below. The preparation to perform the authentication operation involves gathering the historical data and loading it into memory. As discussed above, preparations in conventional authentication techniques involve loading database entries from a database server, where each database entry represents a previous login request from the user and contains information including, for example, the IP address from where and the time at which the request was initiated.

In the improved technique, however, the number of distinct IP addresses each day for the past 30 days is precomputed in a window array 15 which is stored on the database server 18 which also stores the database containing the database entries. The window array 15 contains time slots, or elements, each in which the number of distinct IP addresses from which the user login requests originate on a particular day is stored. For example, a window array can represent the days between January 1 and January 30, with each element representing 1 day. A user who initiates one login request each day from IP address X would have a window array with 30 elements, the element associated with the last date having a value of 1.

The benefit of using the window array 15 is that, in a very small storage space, the same information relevant to the IP velocity calculation is contained as in all the database entries associated with the user over the past 30 days. All that is needed, in addition to the window array, to compute the current value of the IP velocity is the current request and a list of unique IP addresses. As this data represents a very small amount of information relative to the previous database entries, there is less data to move and the time needed for the preparation to perform the authentication operation is reduced dramatically. Further, the use of the window array speeds up the process of computing an IP velocity because smaller amounts of data sitting on a memory allow for faster memory speeds to be used. The details of the calculation of the IP velocity will be discussed below with reference to FIGS. 6(a) and 6(b). Further details of window array 15 are specified below with respect to FIG. 4.

Database server 18, then, is constructed and arranged to store window array 15 containing the number of, say, distinct IP addresses each day for 30 days from which user 11 sent login requests 13 to remote server 14. Database server 18 also stores the list of unique facts, say IP addresses. This list exists because a login request may originate from an IP address which was already used and need not be counted in the window array and the list helps track which IP addresses have been counted.

During operation, user 11 initiates authentication request 13 from client computer 12 using, e.g., the web browser. Client computer 12 sends authentication request 13 to remote server 14 through communications medium 19. Upon receipt of the authentication request 13, remote server 14 sends an analysis request 17 to authentication server 16 and data associated with authentication request 13 to database server 18. Upon receipt of analysis request 17, authentication server 16 extracts data associated with authentication request 13 and window array 15 from database server 18. Based upon the data associated with authentication request 13, authentication server 16 makes adjustments to elements of window array 15, the adjustments resulting in an updated window array 15'. Using window array 15', authentication server 16 determines a fact velocity by counting the total number of distinct fact values in window array 15. The value of the fact velocity is employed in the production of an authentication result 21 which authentication server 16 sends to remote server 14. Further, authentication server 16 sends updated window array 15' to database server 18 for storage.

Additional details of how authentication server 16 produces an authentication result 21 using data from database server 18 will be explained below with regard to FIG. 2, FIG. 3 and FIG. 4.

Figure 2:
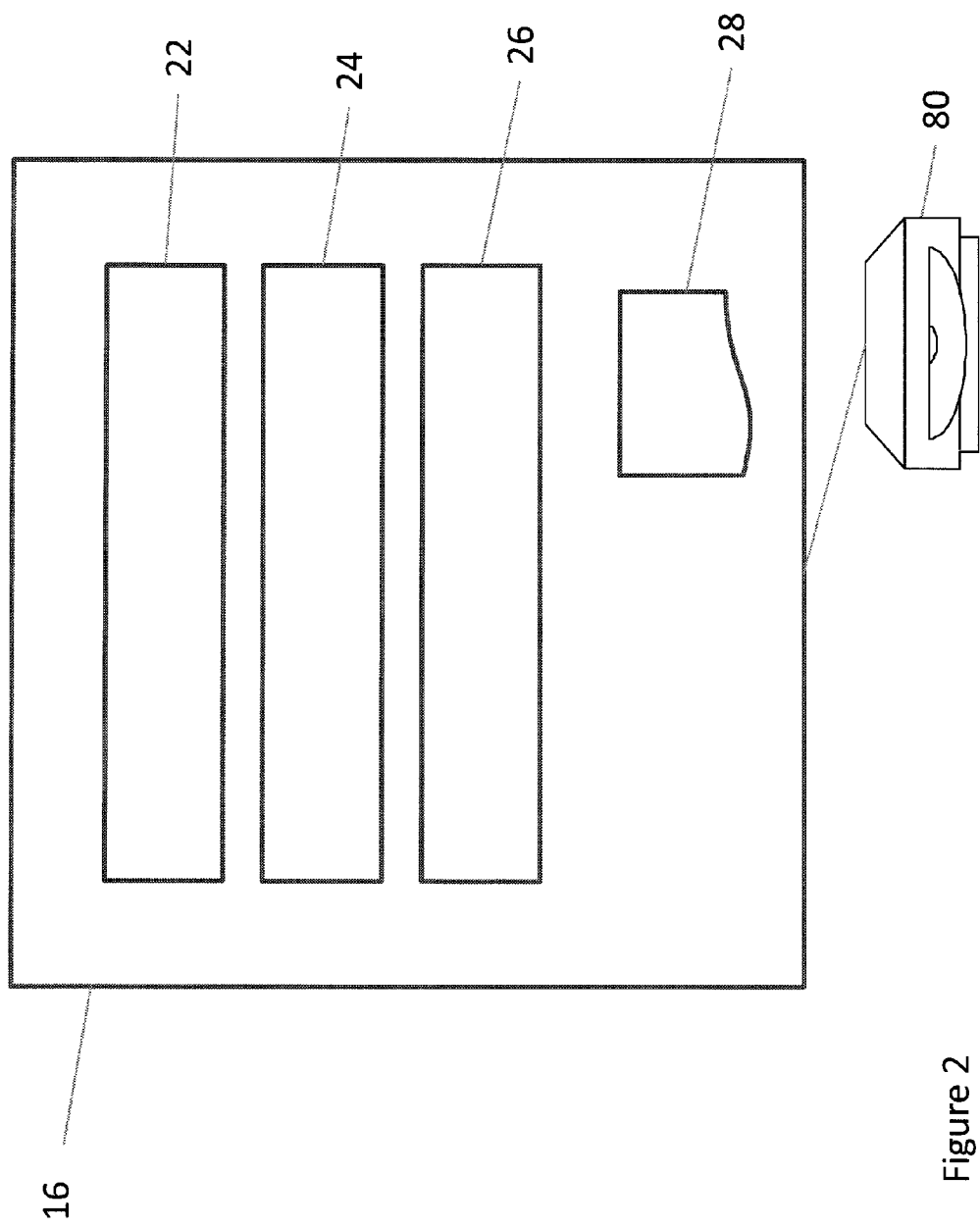
FIG. 2 is a schematic diagram of an authentication server for use in the electronic environment of FIG. 1.

FIG. 2 shows further detail of authentication server 16. Authentication server 16 includes processor 22, memory 24 and network interface 26. In adaptive authentication applications, authentication server further includes risk engine 28.

Memory 24 is configured to store a computer program 80 which is constructed and arranged to authenticate user 11 on a client computer 12. In the examples provided below, memory 24 is a cache, but can generally take the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the computer program 80 stored in memory 24.

Network interface 26 is configured to receive analysis request 17 from remote server 14 and data associated with authentication request 13 and window array 15 from database server 18. Network interface 26 is further configured to send updated window array 15' to database server 18 and authentication result 21 remote server 14.

In some arrangements, risk engine 28 is configured to perform an adaptive authentication operation which produces authentication result 21.

Figure 3:
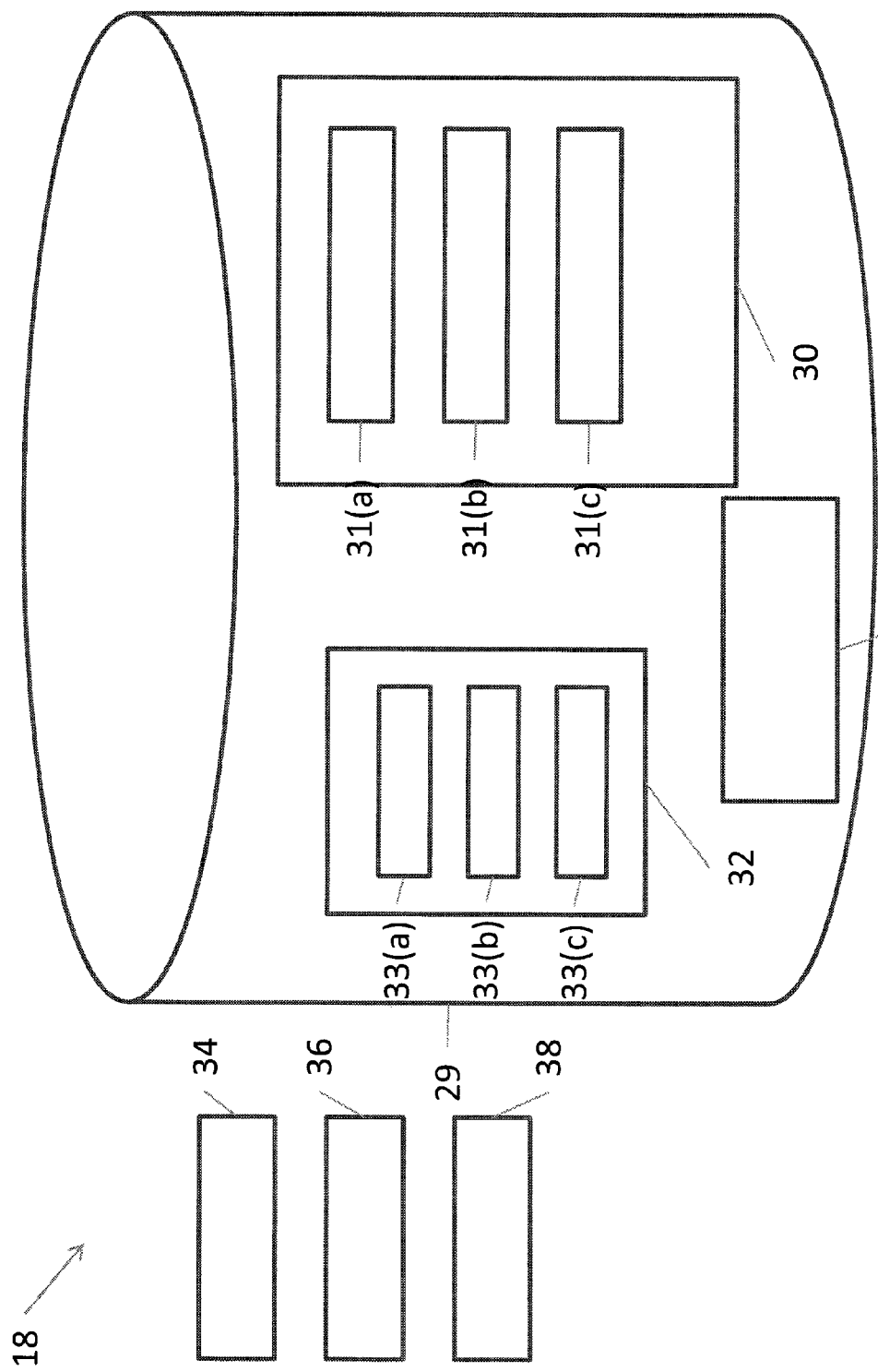
FIG. 3 is a schematic diagram of a database server for use in the electronic environment of FIG. 1.

FIG. 3 shows further detail of database server 18. Database server 18 includes a non-volatile storage 29 on which window array 15, a database 30 and a table 32 of distinct facts is stored. Database server 18 further includes a processor 34, memory 36 and network interface 38.

Memory 36 is configured to store data relating to table 32.

Processor 34 is coupled to memory 36 and can take the form of, but is not limited to, an Intel or AMD-based MPU, and can be a single or multi-core running single or multiple threads. Processor 34 is configured to process requests for user data from authentication server 16. Processor 34 is further configured to store data associated with authentication request 13 in database 30.

Network interface 36 is configured to receive requests for user data from and send user data to authentication server 16. Network interface 36 is further configured to receive data associated with authentication request 13.

Database 30 includes a set of database entries 31(*a*), 31(*b*), 31(*c*) [i.e., database entries 31] relating to historical authentication request data from user 11. Each database entry, say 31(*a*), includes a value of a fact [e.g., IP address] and a timestamp which denotes the time the request associated with database entry 31(*a*) was made.

While storage of these database entries remains important for other applications, for the improved technique described here, the database entries are not necessary. Rather, the window array 15 and the table of distinct facts 32 which are used in the fact velocity calculation outlined below.

Table 32 includes a set of table entries 33(*a*), 33(*b*), 33(*c*) [i.e., table entries 33] which represents a listing of distinct fact values which have been used over a specified time period. Each table entry, say 33(*a*) includes a fact value and a time value corresponding to the most recent modification time of the fact value of table entry 33(*a*). The fact values contained in table entries 33 make up a list of distinct fact values, e.g., a list of distinct IP addresses used in the past 30 days, along with the last time each distinct IP address was used in a request. In some arrangements, the list of distinct fact values includes those fact values whose corresponding timestamps fall within a predetermined time range.

As described above, window array 15 contains information relating to a history of distinct values of a fact [e.g., IP address] associated with a user over a specified time period. Further details of window array 15 will be explained below with regard to FIG. 4.

Figure 4:
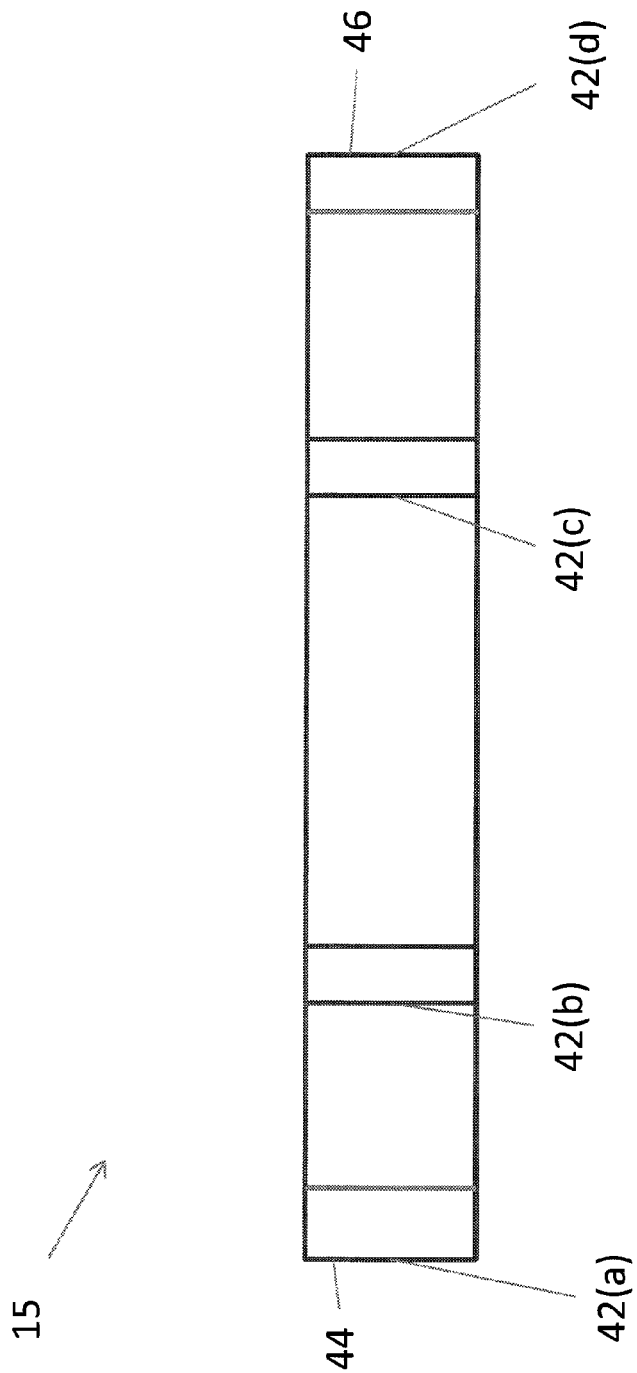
FIG. 4 is a schematic diagram of a window array to be extracted by the authentication server of FIG. 2.

FIG. 4 shows further details of window array 15. Window array 15 includes elements 42(*a*), 42(*b*), 42(*c*), 42(*d*), . . . [i.e., elements 42], each of which are associated with a time period. In some arrangements, the aggregation of all of the time periods make up a time window having a start time 44 and end time 46. In some further arrangements, the start time of the time window is set equal to a numerical difference between the end time of the time window and a predetermined fixed window width.

In some arrangements, the elements 42 are arranged in a temporal order which corresponds to a first element 42(*d*) corresponding to a latest time period and the last element 42(*a*) corresponding to an earliest time period. For example, let window array have a fixed window width of 30 days with the time period corresponding to each element 42 being 1 day. If the end time 46 is January 30, then the start time 44 is January 1.

Each element 42 includes a value which includes the number of distinct fact values contained in user requests initiated on the time period corresponding to the element. For example, for the window array described above, if the twelfth element has a value of 3, and the fact is taken to be the IP address from which the request originates, then 3 distinct IP address values were initiated on January 19 [=30−12+1].

During operation, network interface 26 receives analysis request 17 and network interface 36 receives data associated with authentication request 13. Upon receipt of analysis request 17, processor 22 determines the user for whom authentication server 16 must request data from database server 18. Further, upon receipt of the data associated with authentication request 13, processor 34 adjusts the table 32 of distinct fact values and modifies table 32 according to the fact value and timestamp of the request. Processor 22 also sends via network interface 26 a signal to database server 18 requesting window array 17 and data associated with authentication request 13. Network interface 26 subsequently receives window array 15 and data associated with authentication request 13. Processor 22 then provides instructions to store window array 15 and data associated with authentication request 13 in memory 24.

In some arrangements, window array 15 includes a value of a most recent modified time which represents the previous time period in which window array had its elements adjusted. In some further arrangements, the timestamp of request 13 corresponds to a time which is later than the most recent modified time of window array 15. In this case, the end time 46 of window array 15 is set equal to the time of the request timestamp 13. The start time 44 is determined by the end time 46 minus the fixed window width. Elements 42 whose time period come earlier than start time 44 are dropped from window array 15. Suppose that in the example above, the most recent modified time is January 30. If a request 13 were initiated on February 3 [4 days after January 30], then the end time 46 is moved from January 30 to February 4 and the start time 44 is moved from January 1 to January 5. Further, the elements of window array corresponding to the time periods January 1, 2, 3 and 4 are dropped from window array 15, meaning that fact velocity calculations using window array 15 will not take into account the values of the elements corresponding to January 1, 2, 3 and 4.

In some further arrangements, the fact value of the request 13 includes a flag which can take the value of new or old and a value of a most recent modified time. Upon receipt of the request 13, processor 34 places the fact value of the request in memory 36. Processor 34 then scans table entries 33 for fact values and attempts to match the fact value of each table entry 33 with the fact value stored in memory 36. If a match is found, then the flag value is set to old and the value of the most recent modified time is set to the time corresponding to the timestamp of request 13. If no match is found, then the flag value is set to new, a new entry is added to table 32 having a fact value set to the request fact value and timestamp set to the request timestamp and the value of the most recent modified time is set to the time corresponding to the timestamp of request 13. In the example above, assume table 32 has 2 entries: the first having a fact value of IP Address X with a most recent modified time of January 24; the second having a fact value of IP Address Y with a most recent modified time of January 30. Further assume request 13 originates from IP Address X. Processor 34 would match IP Address X of the first table element with the IP Address X of request 13. The flag of the request fact value is set to old because IP Address X was found in table 32. Further, the most recent modified time of the request fact value is January 24.

Once window array 15 and data associated with authentication request 13 are stored in memory 24, processor 22 adjusts the value of each element 42 of window array 15 according to the fact value and timestamp of the request 13. Details of the adjustment of the value of each element 42 will be provided below with regard to FIGS. 6(a) and 6(b).

Adjustment of the value of each element 42 results in an updated window array 15' stored in memory 24. Processor 22 computes the fact velocity by summing the value of each element 42 over the window array 15. The fact velocity is then employed as an input to an authentication operation. In an adaptive authorization application, processor 22 sends the value of the fact velocity to risk engine 28 and the adaptive authentication operation takes the form of a risk assessment of which the fact velocity is one component. In some arrangements, the result of the authentication operation is a risk score associated with the request 13.

Once the result of the authentication operation has been determined, network interface 26 sends the result to remote server 14. Updated window array 15' along with its new value of its most recent modified time is sent to database server 18. Network interface 26 receives updated window array 15', which is sent to memory 36 from which processor 34 stores updated window array 15' on non-volatile storage 29.

By using the window array 15 and a single request to carry out computation of the fact velocity, very little memory is used on authentication server 16. By using such a small amount of memory, the memory can be very fast and throughput of the fact velocity computations is increased greatly.

In some arrangements, user 11 has no records in database 30. In this case, processor 34 will create a new window array 15 on storage 29. The values of the elements of this new window array 15 will all be zero.

Figure 5:
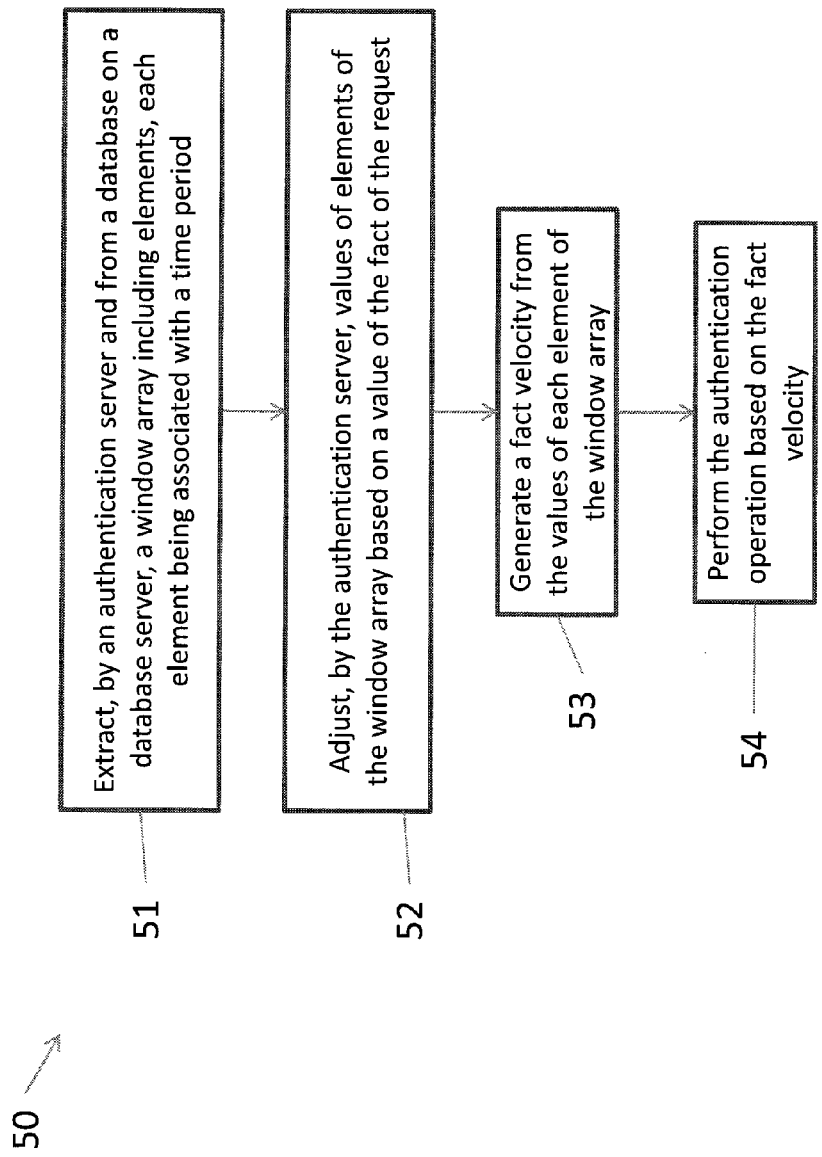
FIG. 5 is a flow chart illustrating a method of carrying out the improved technique within the electronic environment of FIG. 1.

FIG. 5 shows a method 50 for carrying out the improved technique. In step 51, a window array including elements is extracted from a database on a database server, each element being associated with a time period. In step 52, the value of the elements of the window array are adjusted based on the value of a fact of a request and a timestamp of the request to form an updated window array. In step 53, a fact velocity is generated from the value of each element of the updated window array. In step 54, an authentication operation is performed based on the fact velocity, with results of the authentication operation sent to a remote server.

Further details of the adjusting in step 52 will be explained with regard to FIGS. 6(a) and 6(b).

Figure 6A:
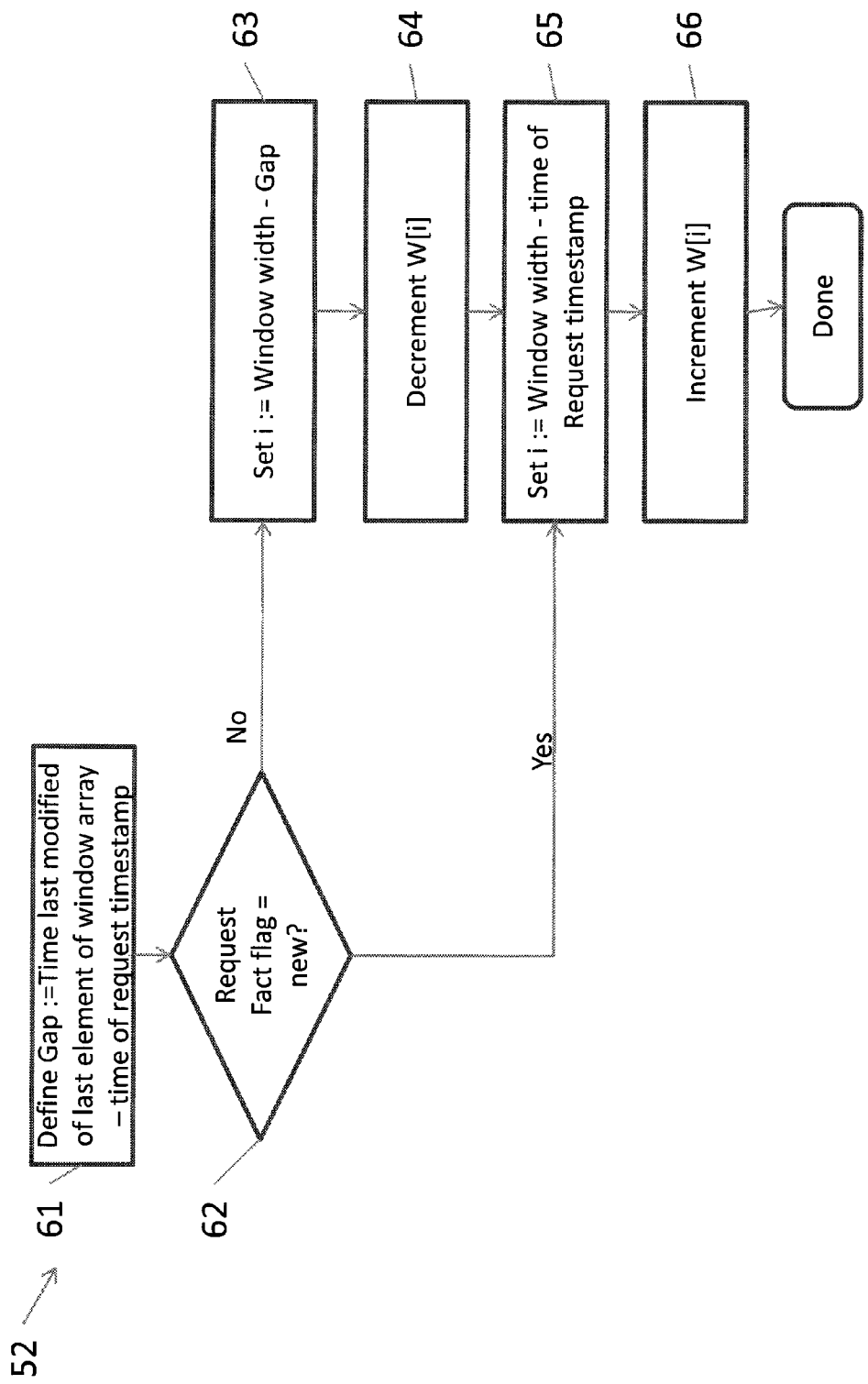
FIG. 6(a) is a flow chart illustrating an updating of the elements of the window array of FIG. 4 for the case of when the timestamp of the request corresponds to a time later than the most recent modification of the window array.

FIG. 6(a) shows details of the adjusting in step 52 for the case of the timestamp of the request corresponding to a time which is later than the value of the most recent modification time of the window array.

In step 61, the quantity Gap is computed as the numerical difference between the time corresponding to the timestamp of the request and the value of the most recent modification time of the window array, expressed in units of a width of the time period with which each element of the window array is associated. In the example above, the timestamp of the request is February 3 and the most recent modification time of the window array is January 30. The value of Gap in this case is then 4 days, or 4 time units, the width of the time period being 1 day.

In step 62, it is determined the value of the flag associated with the fact value of the request. In the example above, the flag value was set to old.

In the case of the flag value being equal to old, the fact value is not distinct. The total fact velocity, or net number of distinct facts in the window array, should not change. The location of the fact value in the window array, however, should reflect the most recent time the fact value was used. The adjusting then involves decrementing by one the value of the element associated with the most recent modified time of the fact value and incrementing by one the value of the element associated with the time corresponding to the timestamp of the request.

In step 63, an index value corresponding to the element associated with the most recent modified time of the fact value is computed.

In step 64, the value of the element at the index value computed in step 63 of the window array is decremented by one.

In step 65, an index value corresponding to the element associated with the time corresponding to the timestamp of the request is computed.

In step 66, the value of the element at the index value computed in step 65 of the window array is incremented by one.

In the example above, the index value associated with the most recent modified time of the fact value [which is January 24] is 11 [=the previous value of 7–the shift of 4]. The value of the window array at the eleventh element is then decremented by one. The index value corresponding to the element associated with the time corresponding to the timestamp of the request is 1, and the value of the window array at the first element is incremented by one.

In the case of the flag value being equal to new, the fact value is distinct and the net number of distinct facts in the window array should increase by one. In this case, only steps 65 and 66 are performed, i.e., there is no decrementing step.

Figure 6B:
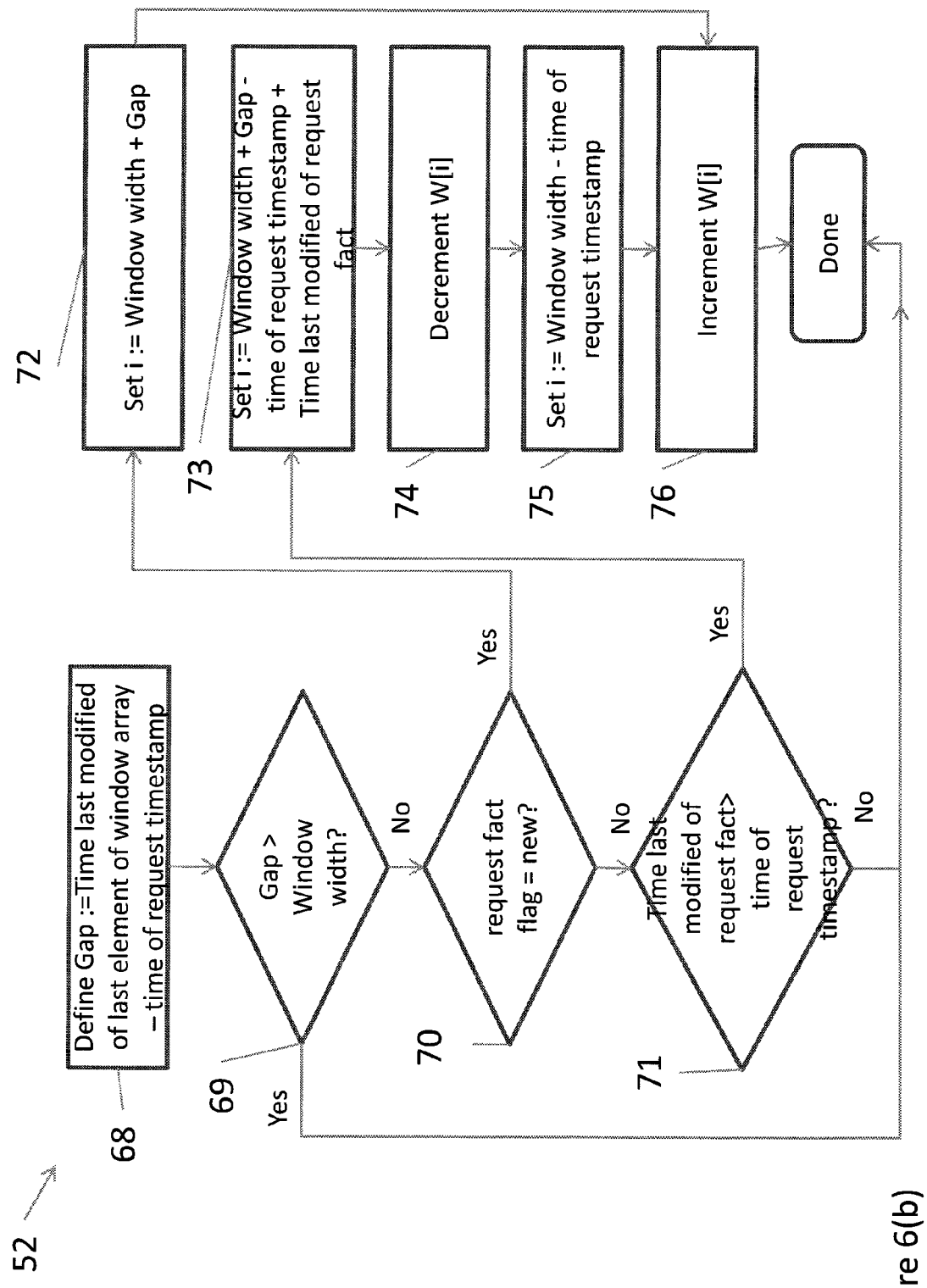
FIG. 6(b) is a flow chart illustrating an updating of the elements of the window array of FIG. 4 for the case of when the timestamp of the request corresponds to a time prior the most recent modification of the window array.

FIG. 6(b) shows details of the adjusting in step 52 for the case of the timestamp of the request corresponding to a time which is earlier than the value of the most recent modification time of the window array. This case corresponds to an out-of-order event because the request time is earlier than the most recent modification time of the window array and involves no shifting of the window in time as was done in the previous case.

In step 68, the quantity Gap is computed as the numerical difference between the value of the most recent modification time of the window array and the time corresponding to the timestamp of the request, expressed in units of a width of the time period with which each element of the window array is associated.

In step 69, Gap is compared to the fixed window width. If the value of Gap is greater than the fixed window width, then the request is old enough that it need not be considered and the window array is not updated.

In step 70, the value of the flag of the fact value of the request is determined. Again, if the flag value is old, then the net number of distinct facts in the window array should remain the same. The adjusting then involves decrementing by one the value of the element associated with the most recent modified time of the fact value and incrementing by one the value of the element associated with the time corresponding to the timestamp of the request. Nevertheless, if the time corresponding to the timestamp of the request is earlier than the most recent modification time of the fact value, then the request is not counted and no updating is made to the window array.

In step 71, the time corresponding to the timestamp of the request is compared with the most recent modification time of the fact value.

In step 73, an index value corresponding to the element associated with the most recent modified time of the fact value is computed.

In step 74, the value of the element at the index value computed in step 73 of the window array is decremented by one.

In step 75, an index value corresponding to the element associated with the time corresponding to the timestamp of the request is computed.

In step 76, the value of the element at the index value computed in step 75 of the window array is incremented by one.

In the case of the flag value being equal to new, the fact value is distinct and the net number of distinct facts in the window array should increase by one. In this case, while there is no decrementing step, the incrementing is done at the most recent time period of the window array.

In step 72, an index value corresponding to the element associated with the most recent modified time of the window array is computed.

In step 76, the value of the element at the index value computed in step 72 of the window array is incremented by one.

While various embodiments of the invention have been particularly shown and described, it will be understood by those skilled in the art that various changes in form and details may be made therein without departing from the spirit and scope of the invention as defined by the appended claims.

For example, a threshold value may be established for each element 42 of window array 15. That is, if the value of an element 42 of window array 15 exceeds the threshold value, then no adjustment is performed on element 42.

Furthermore, it should be understood that some embodiments are directed to an electronic environment which utilizes systems that authenticate a user on a client computer. Some embodiments are directed to authentication server 16. Some embodiments are directed to a system which performs authentication of a user on a client computer. Some embodiments are directed to a process of authenticating a user on a client computer. Also, some embodiments are directed to a computer program product which enables computer logic to perform authentication of a user on a client computer.

In some arrangements, authentication server 16 is implemented by a set of processors or other types of control/processing circuitry running software. In such arrangements, the software instructions can be delivered to authentication server 16 in the form of a computer program product 80 (illustrated generally by a diskette icon 80 in FIG. 2) having a computer readable storage medium which stores the instructions in a non-volatile manner. Examples of suitable computer readable storage media include tangible articles of manufacture and apparatus such as CD-ROM, flash memory, disk memory, tape memory, and the like.

What is claimed is:

1. A method of authenticating a user on a client computer, the user sending, from the client computer to a remote server, a request to perform an authentication operation, the request including a value of a fact and a timestamp, the method comprising:

extracting, by an authentication server and from a database on a database server, a window array including elements, each element being associated with a time period;

adjusting, by the authentication server, the value of the elements of the window array based on the value of the fact of the request and the timestamp of the request to form an updated window array;

generating, by the authentication server, a fact velocity from the value of each element of the updated window array; and performing, by the authentication server, the authentication operation based on the fact velocity, results of the authentication operation being sent to the remote server, wherein the window array includes a value of a most recent modification time;

wherein the timestamp of the request corresponds to a time which is later than the value of the most recent modification time of the window array;

wherein an aggregation of the time period associated with each element of the window array forms a time window having a start time and an end time; and wherein the start time of the time window is set to a numerical difference between the end time of the time window and a fixed window width;

wherein extracting the window array includes:

setting the end time of the time window equal to the time corresponding to the timestamp of the request; and setting the value of the most recent modification time of the window array equal to the time corresponding to the timestamp of the request.

2. A method as in claim 1, wherein the value of the fact of the request includes a value of a most recent modification time and a flag having a value taken from a set of values which includes the values of new and old;

wherein each element has a same value of the time period;

wherein the elements of the window array are arranged in a temporal order which corresponds to the first element corresponding to the end time of the time window and the last element corresponding to the start time of the time window; and wherein adjusting values of elements of the window array based on a value of the fact of the request includes:

when the request flag is equal to new:

incrementing the value of the first element of the window array; and when the flag of the fact of the request is old:

setting a time difference equal to a numerical difference between the value of the most recent modification time of the value of the fact and the value of the most recent modification time of the window array;

decrementing a value of an element of the window array, the element having an address determined by the number of time periods in the time difference; and incrementing the value of the first element of the window array.

3. A method as in claim 2, further comprising:

setting the value of the flag of the fact of the request to new if:

the value of a most recent modification time of the value of the fact is equal to the time corresponding to the timestamp of the request; or the value of a most recent modification time of the fact is earlier than the start time of the window array; and setting the value of the flag of the fact of the request to new if the value of a most recent modification time of the fact is earlier than the end time of the window array and later than the start time of the window array.

4. A method as in claim 1, wherein the window array includes a value of a most recent modification time;
wherein the timestamp of the request corresponds to a time which is earlier than the value of the most recent modification time of the window array;
wherein an aggregation of the time period associated with each element of the window array forms a time window having a start time and an end time;
wherein the start time of the time window is set to a numerical difference between the end time of the time window and a fixed window width;
wherein extracting the window array includes:
setting the end time of the time window equal to the time corresponding to the timestamp of the request; and
setting the value of the most recent modification time of the window array equal to the time corresponding to the timestamp of the request.

5. A method as in claim 4, wherein the value of the fact of the request includes a value of a most recent modification time and a flag having a value taken from a set of values which includes the values of new and old;
wherein each element has a same value of the time period;
wherein the elements of the window array are arranged in a temporal order which corresponds to the first element corresponding to the end time of the time window and the last element corresponding to the start time of the time window; and
wherein adjusting values of elements of the window array based on a value of the fact of the request includes:
when the time corresponding to the timestamp of the request is later then the start time of the time window:
when the request flag is equal to new:
incrementing the value of the first element of the window array; and
when the flag of the fact of the request is old:
setting a time difference equal to a numerical difference between the value of the most recent modification time of the value of the fact and the value of the most recent modification time of the window array;
when the number of time periods in the time difference is less than the number of elements in the window array:
decrementing a value of an element of the window array, the element having an address determined by the number of time periods in the time difference; and
incrementing the value of the first element of the window array.

6. A method as in claim 1, further comprising:
verifying, prior to the extracting of the window array, whether the fact of the user is stored on the database; and
when the fact of the user is not stored on the database:
initializing, by the authentication server, a window array, the elements of the window array having values set to zero.

7. A method as in claim 1, wherein adjusting values of the elements of the window array based on a value of the fact of the request includes:
when the value of the element of the window array determined according to the timestamp of the request is greater than or equal than a threshold value, keeping the value of the element fixed.

8. A method as in claim 1, wherein generating the fact velocity includes:
forming a sum over the value of each element of the window array;
setting a value of the fact velocity equal to the sum; and
storing the updated window array on the database server.

9. A method as in claim 1, wherein the authorization server includes a risk engine; and
performing the authentication operation includes:
performing, by the risk engine, an adaptive authorization operation.

10. A method as in claim 1,
wherein the window array is stored in the database server;
wherein a fact table is stored in the database server, the fact table including entries having a unique fact value and a fact timestamp;
wherein adjusting the value of the elements of the window array based on the value of the fact and the timestamp of the request includes:
performing a lookup operation on the fact table, the lookup operation serving to verify whether the value of the fact in the request is in an entry of the fact table, wherein the fact velocity depends on whether the value of the fact is in the fact table.

11. A method as in claim 10,
wherein the value of the fact of the request includes a value of a most recent modification time and a flag having a value taken from a set of values which includes the values of new and old;
wherein adjusting the value of the elements of the window array based on the value of the fact and the timestamp of the request further includes:
setting the value of the flag to new when the lookup operation verifies that the value of the fact in the request is not in an entry of the fact table, and
setting the value of the flag to old when the lookup operation verifies that the value of the fact in the request is in an entry of the fact table.

12. A system for authenticating a user on a client computer, the user sending, from the client computer to a remote server, a request to perform an authentication operation, the request including a value of a fact and a timestamp, the system comprising:
an authentication server including:
a network interface connected to a network; a memory; and
a processor coupled to the memory, the processor constructed and arranged to:
extract, from a database on a database server, a window array including elements, each element being associated with a time period;
adjust the value of the elements of the window array based on the value of the fact of the request and the timestamp of the request to form an updated window array;
generate a fact velocity from the values of each element of the updated window array;
perform the authentication operation based on the fact velocity, results of the authentication operation being sent to the remote server, wherein the window array includes a value of a most recent modification time;
wherein the timestamp of the request corresponds to a time which is later than the value of the most recent modification time of the window array;
wherein an aggregation of the time period associated with each element of the window array forms a time window having a start time and an end time;
wherein the start time of the time window is set to a numerical difference between the end time of the time window and a fixed window width;
wherein extracting the window array includes:

setting the end time of the time window equal to the time corresponding to the timestamp of the request; and
setting the value of the most recent modification time of the window array equal to the time corresponding to the timestamp of the request.

13. A system as in claim 12, wherein the value of the fact of the request includes a value of a most recent modification time and a flag having a value taken from a set of values which includes the values of new and old;
wherein each element has a same value of the time period;
wherein the elements of the window array are arranged in a temporal order which corresponds to the first element corresponding to the end time of the time window and the last element corresponding to the start time of the time window; and
wherein adjusting values of elements of the window array based on a value of the fact of the request includes:
when the request flag is equal to new:
incrementing the value of the first element of the window array; and
when the flag of the fact of the request is old:
setting a time difference equal to a numerical difference between the value of the most recent modification time of the value of the fact and the value of the most recent modification time of the window array;
decrementing a value of an element of the window array, the element having an address determined by the number of time periods in the time difference; and
incrementing the value of the first element of the window array.

14. A system as in claim 13, wherein the processor is further constructed and arranged to:
set the value of the flag of the fact of the request to new if:
the value of a most recent modification time of the value of the fact is equal to the time corresponding to the timestamp of the request; or
the value of a most recent modification time of the fact is earlier than the start time of the window array; and
set the value of the flag of the fact of the request to new if the value of a most recent modification time of the fact is earlier than the end time of the window array and later than the start time of the window array.

15. A system as in claim 12, wherein the window array includes a value of a most recent modification time;
wherein the timestamp of the request corresponds to a time which is earlier than the value of the most recent modification time of the window array;
wherein an aggregation of the time period associated with each element of the window array forms a time window having a start time and an end time;
wherein the start time of the time window is set to a numerical difference between the end time of the time window and a fixed window width;
wherein extracting the window array includes:
setting the end time of the time window equal to the time corresponding to the timestamp of the request; and
setting the value of the most recent modification time of the window array equal to the time corresponding to the timestamp of the request.

16. A system as in claim 15, wherein the value of the fact of the request includes a value of a most recent modification time and a flag having a value taken from a set of values which includes the values of new and old;
wherein each element has a same value of the time period;
wherein the elements of the window array are arranged in a temporal order which corresponds to the first element corresponding to the end time of the time window and the last element corresponding to the start time of the time window; and
wherein adjusting values of elements of the window array based on a value of the fact of the request includes:
when the time corresponding to the timestamp of the request is later then the start time of the time window:
when the request flag is equal to new:
incrementing the value of the first element of the window array; and
when the flag of the fact of the request is old:
setting a time difference equal to a numerical difference between the value of the most recent modification time of the value of the fact and the value of the most recent modification time of the window array;
when the number of time periods in the time difference is less than the number of elements in the window array:
decrementing a value of an element of the window array, the element having an address determined by the number of time periods in the time difference; and
incrementing the value of the first element of the window array.

17. A system as in claim 12, wherein the processor is further configured and arranged to:
verify, prior to the extracting of the window array, whether the fact of the user is stored on the database; and
when the fact of the user is not stored on the database:
initializing, by the authentication server, a window array, the elements of the window array having values set to zero.

18. A computer program product having a non-transitory computer readable storage medium which stores code to authenticate a user on a client computer, the user sending, from the client computer to a remote server, a request to perform an authentication operation, the request including a value of a fact and a timestamp, the code including instructions to:
extract, from a database on a database server, a window array including elements, each element being associated with a time period;
adjust, by the authentication server and upon receiving the request, the value of elements of the window array based on a value of the fact of the request and the timestamp of the request to form an updated window array;
generate, by the authentication server, a fact velocity from the values of each element of the updated window array;
perform, by the authentication server, the authentication operation based on the fact velocity, results of the authentication operation being sent to the remote server; and
store the updated window array on the database server, wherein the window array includes a value of a most recent modification time;
wherein the timestamp of the request corresponds to a time which is later than the value of the most recent modification time of the window array;
wherein an aggregation of the time period associated with each element of the window array forms a time window having a start time and an end time;
wherein the start time of the time window is set to a numerical difference between the end time of the time window and a fixed window width;

wherein extracting the window array includes:
setting the end time of the time window equal to the time corresponding to the timestamp of the request; and
setting the value of the most recent modification time of the window array equal to the time corresponding to the timestamp of the request.

19. A computer program product as in claim 18,
wherein the value of the fact of the request includes a value of a most recent modification time and a flag having a value taken from a set of values which includes the values of new and old;
wherein each element has a same value of the time period;
wherein the elements of the window array are arranged in a temporal order which corresponds to the first element corresponding to the end time of the time window and the last element corresponding to the start time of the time window; and
wherein adjusting values of elements of the window array based on a value of the fact of the request includes:
when the request flag is equal to new:
incrementing the value of the first element of the window array; and when the flag of the fact of the request is old:
setting a time difference equal to a numerical difference between the value of the most recent modification time of the value of the fact and the value of the most recent modification time of the window array;
decrementing a value of an element of the window array, the element having an address determined by the number of time periods in the time difference; and
incrementing the value of the first element of the window array.

20. A computer program product as in claim 18, wherein the window array includes a value of a most recent modification time;
wherein the timestamp of the request corresponds to a time which is earlier than the value of the most recent modification time of the window array;
wherein the value of the fact of the request includes a value of a most recent modification time and a flag having a value taken from a set of values which includes the values of new and old;
wherein each element has a same value of the time period;
wherein the elements of the window array are arranged in a temporal order which corresponds to the first element corresponding to the end time of the time window and the last element corresponding to the start time of the time window; and
wherein adjusting values of elements of the window array based on a value of the fact of the request includes:
when the time corresponding to the timestamp of the request is later then the start time of the time window:
when the request flag is equal to new:
incrementing the value of the first element of the window array; and
when the flag of the fact of the request is old:
setting a time difference equal to a numerical difference between the value of the most recent modification time of the value of the fact and the value of the most recent modification time of the window array;
when the number of time periods in the time difference is less than the number of elements in the window array:
decrementing a value of an element of the window array, the element having an address determined by the number of overlapping time periods in the time difference; and
incrementing the value of the first element of the window array.

\* \* \* \* \*